Sept. 25, 1928.
F. E. KEY
1,685,250
APPARATUS FOR DISPENSING ICE CREAM AND THE LIKE
Filed Nov. 1, 1926
3 Sheets-Sheet 1
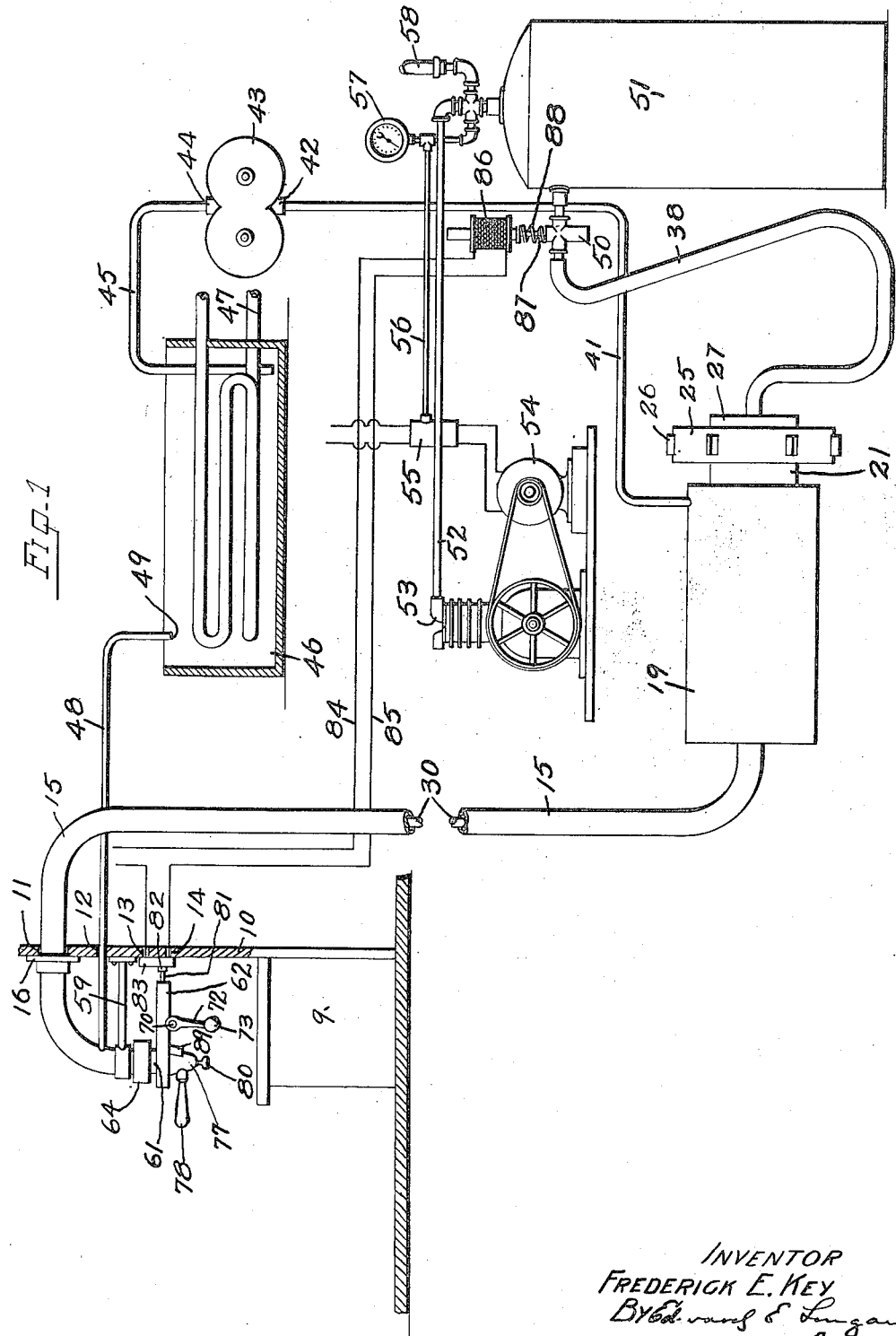
INVENTOR
FREDERICK E. KEY
By Edward E. Lungau
ATTY.

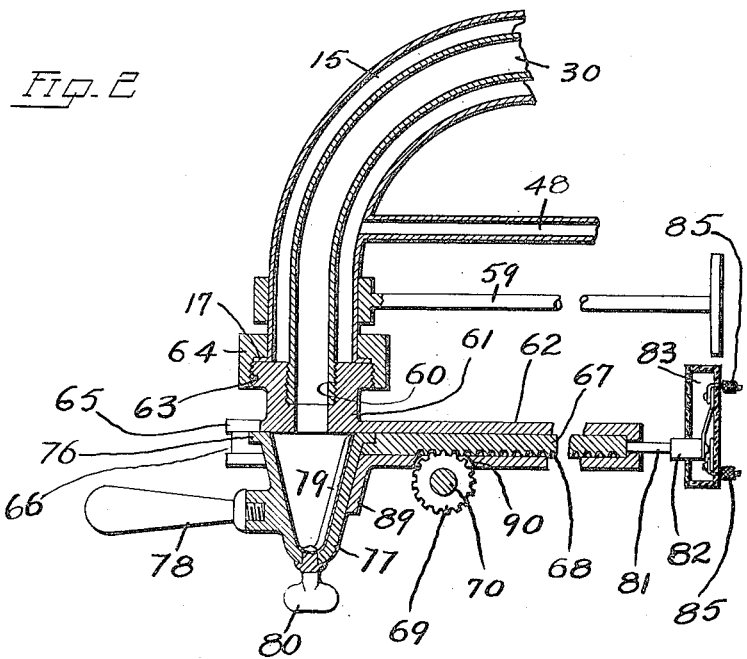
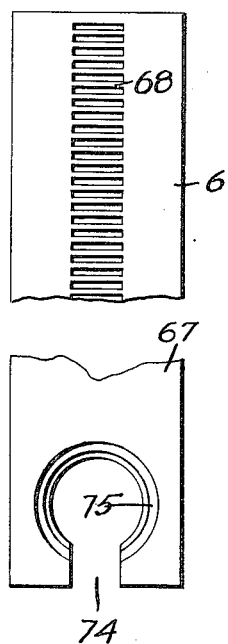
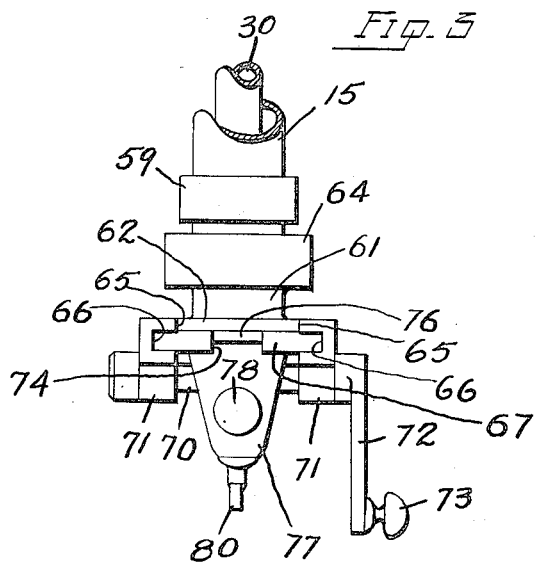

Sept. 25, 1928.  
F. E. KEY  
1,685,250  
APPARATUS FOR DISPENSING ICE CREAM AND THE LIKE  
Filed Nov. 1, 1926  
3 Sheets-Sheet 3

INVENTOR  
FREDERICK E. KEY  
By Edward C. Lingan  
ATTY.

Patented Sept. 25, 1928.

1,685,250

UNITED STATES PATENT OFFICE.

FREDERICK E. KEY, OF EAST ST. LOUIS, ILLINOIS.

APPARATUS FOR DISPENSING ICE CREAM AND THE LIKE

Application filed November 1, 1926. Serial No. 145,477.

My invention relates to improvements in apparatus for dispensing ice cream and the like, and has for its primary object a method whereby ice cream is delivered into a mold or dispenser by means of pressure so that a uniform amount thereof will be served at all times.

A further object is the method of dispensing ice cream and the like, which obviates entirely the necessity of having a can with a removable cover into which a dispensing device is dipped and the ice cream scooped out. It frequently happens where ice cream is dispensed in the above manner that the can is not promptly covered thereby permitting foreign substances to fall into the can as well as to let flies or other insects get into the can.

Another disadvantage of dispensing ice cream from the can by means of scoops is that very frequently salt or brine enters the can causing a discontented customer by reason of getting salty ice cream.

Another feature is that where cans are left open, there is always a possibility of dust or other foreign substances, which float around in the air, from lodging on the surface of the cream being dispensed and it gradually finds its way to the customer.
By my method there is absolutely no possibility of any of the above happening because the ice cream prior to its being forced into the dispenser is absolutely sealed so that nothing can possibly reach it.
A still further object is to construct a device wherein ice cream or similar food articles are dispensed by being forced out under pressure from a tube into a dispenser and when the dispenser has been filled, the delivery of the article is halted.

A still further object is to construct an apparatus which delivers food articles, such as ice cream and the like, under pressure into a dispenser and in which the pressure causing said delivery is automatically stopped when the dispenser is removed from the device.

A still further object is to construct an apparatus for dispensing ice cream and like food articles, in which the ice cream is fully protected from any contamination whatsoever such as flies, dust, salt and the like. In other words, the ice cream or similar article is not even exposed to the atmosphere at any time from the time in which it is placed in the container until it is delivered into the dispensing device, and by my apparatus and method I am enabled to dispense such plastic food articles as ice cream and the like in a more sanitary manner than has been heretofore done, and at the same time keep the same in perfect condition.

In the drawings:

Fig. 1 is a diagrammatic view of one form of apparatus by which my method can be carried out;

Fig. 2 is an enlarged vertical section of the dispensing end of the apparatus illustrating the manner in which the dispenser is moved to and from and in which the supply of material is cut off simultaneously with the stopping of the pressure;

Fig. 3 is a front view of Fig. 2;

Fig. 4 is a bottom plan view of a portion of the valve made use of illustrating the rack;

Fig. 5 is a top plan view of the forward portion of the valve illustrating the seat for the dispensing device and the slot cut therein for the passage of the handle;

Figure 6:
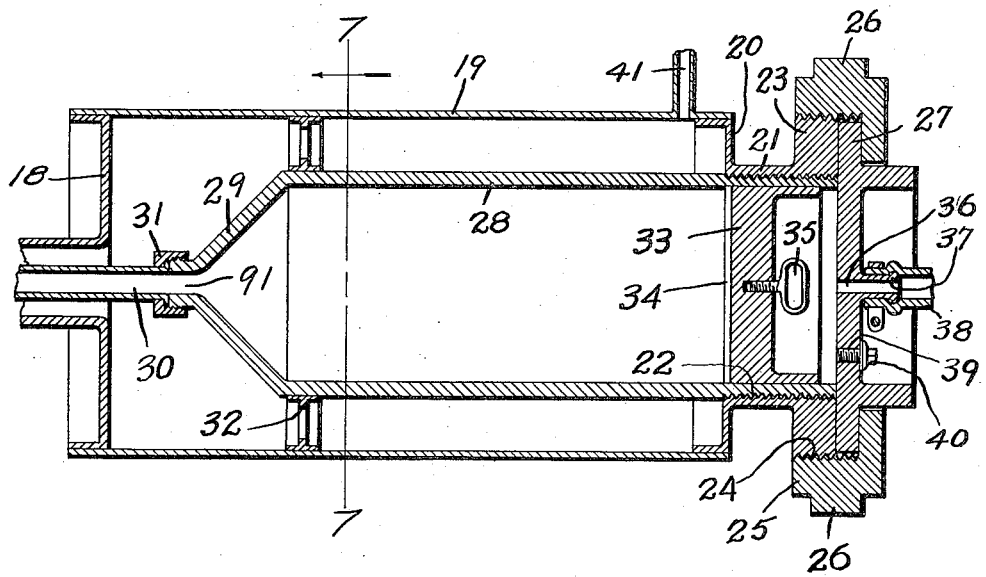
Fig. 6 is an enlarged vertical section of the magazine and its component parts illustrating the means by which the same can be opened for recharging and the means for cooling the magazine so as to keep its contents in proper condition;
Figures 7, 8:
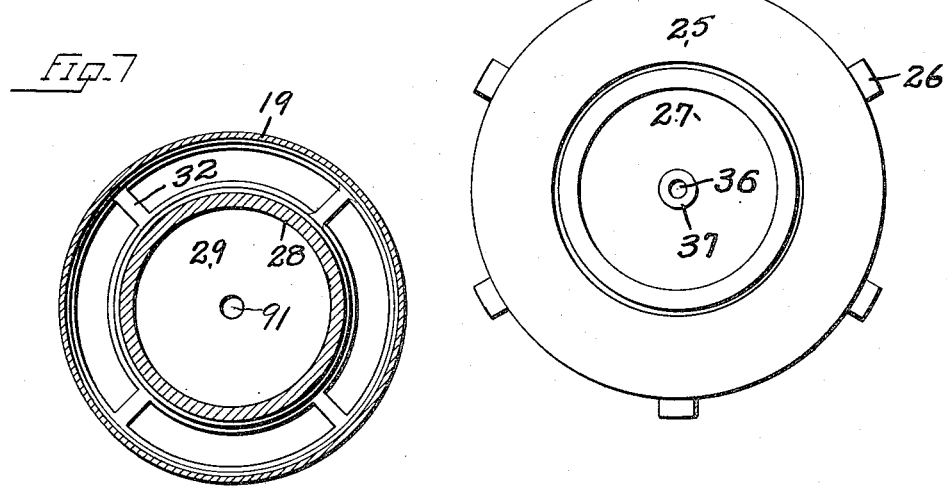
Fig. 7 is a vertical cross section taken on the line 7—7 of Fig. 6.
Fig. 8 is an enlarged view of the rear end of the magazine.

In the construction of my device, 9 represents a dispensing counter, and 10 an upward extension thereof. This upward extension may be either integral with the counter or it may constitute the wall of a building. Formed through the extension 10 are openings 11, 12, 13 and 14. Passing through the opening 11 is a pipe 15 which is provided with a flange 16 abutting the wall so as to close the opening 11. The pipe 15 after passing through the wall 10 and flange 16 is bent downwardly as indicated in Figs. 1 and 3. The lower end of the pipe 15 is flanged outwardly as indicated by the numeral 17, the purpose of which will be explained in detail later. The opposite end of the pipe 15 terminates in the head 18 which is secured to a casing 19, the head 18 being secured at one end of the casing. Secured to the opposite end of the casing 19 is a head 20 which is provided with an outwardly extending sleeve 21. This sleeve is internally screw threaded as indicated by the numeral 22. The end of the sleeve 21 is provided with an outwardly extending flange 23, which is screw threaded as at 24 so as to receive the locking ring 25. This locking ring is provided with projections 26 by means of which it can be secured on or removed from the flange 23. The purpose of this locking ring is to secure the head 27 in position.

Located within the casing 19 is a magazine 28, its rear end being screw threaded so as to engage with the screw threads 22 and abut the head 27. The forward end of the magazine 28 is tapered as at 29, and to this tapered end is secured a delivery pipe 30. This pipe is held in positon by means of a nut 31. The forward end of the magazine is supported within the casing 19 by means of a spider or similar support 32.

Slidably mounted within the magazine is a removable piston 33, its forward face being provided with a layer of resilient material 34. This resilient material is to prevent leakage of the ice cream past the piston 33. The piston is also provided with a handle 35 by means of which it can be withdrawn from or replaced in the magazine. The cylinder head 27 is provided with a central passageway 36 surrounding which is a nipple or projection 37 to which a flexible tubular member 38 is secured. This tubular member may be either a flexible metal tube or it may be air hose, such as is commonly used on railway trains. In other words it is a flexible conduit capable of conveying air under pressure.

The head 27 is also provided with a screw threaded bore 39 in which a screw 40 is seated. The purpose of this screw is to release pressure in the magazine when it is desired to open the same for introducing a new charge and by reason of its being a screw and closing only a relatively small port the pressure within the magazine can be gradually released. This would not be possible were the securing ring 25 loosened as the pressure would have a tendency to blow out the head 27 suddenly and possibly injure the person removing the head. I may also, if desired, loosen the screw 40 slightly so that the pressure to the rear of the piston will be slowly released when the introduction of pressure ceases.

Carried by the casing 19 is a pipe 41 which is secured to the discharge port 42 of a circulating pump 43. The in-take port 44 of this pump has secured thereto a pipe 45 which terminates adjacent the bottom of a tank 46 which is adapted to contain a non-freezing solution. The solution in the tank is chilled by means of a refrigerating coil 47, the refrigerant supplied to this coil being obtained from any suitable source not shown.

It will be noted from Fig. 6 that the casing 19 is in direct communication with the pipe 15 and in order to provide a continuous circulation of cooling fluid while the pump 43 is in operation, a return pipe 48 is employed. This pipe passes through the opening 12 and opens into the pipe 15, its opposite end 49 terminating in the upper portion of the tank 46 so that a continuous circulation of cooling fluid around the pipe 30 can be maintained. The speed of circulation being controlled by the speed of the pump.

The flexible member or hose 38 has its one end, as previously described, secured to the head 27, the opposite end being secured to the valve 50, which is in turn connected to the air reservoir 51. The air reservoir is connected by means of the pipe 52 to an air pump 53, the air pump being driven by means of a motor 54. The motor 54 is controlled by an automatic switch 55, which is operated by air pressure passing through the pipe 56 from the tank. This switch is not described in detail but is of the automatic type such as is used in filling stations, and is designed to start the motor 54 whenever the pressure in the tank 51 drops below a predetermined amount. The tank 51 is provided with the usual air gauge 57 and safety valve 58. 59 represents a brace by means of which the end of the pipe 15 above the counter 9 is supported and held so that the manipulation of the valve, hereafter to be described, will not in any way tend to place undue strain on the pipe.

It will be noted from Fig. 2 that the pipe 30 extends downward beyond the edge or end 17 of the pipe 15. This projecting end of the pipe 30 is provided with screw threads 60 which snugly fit in the extension 61 of the valve housing 62. The upper end of the extension 61 is provided with a screw threaded flange 63 to receive the nut or collar 64 by means of which the flange 17 is drawn down on the screw threaded flange 63 thereby preventing any leakage of fluid which surrounds the pipe 30.

The housing 62 is divided at its forward end as indicated by the numeral 65 and is provided with slots as indicated by the numeral 66. See Fig. 3. In the slots 66 is mounted a valve 67 which consists of a flat plate as illustrated in Figs. 4 and 5. The rear portion of the valve 67 is provided with gear teeth 68 which mesh with a pinion 69. The pinion 69 is mounted on a shaft 70 which is carried by bearings 71 formed integral with the housing 62. Secured to one end of the shaft 70 is an arm 72 which is provided with a handle 73 and by means of which the gear is placed in rotation. The valve 67 is provided adjacent its forward end with a slot 74 and with a circular bore 75. This circular bore is designed to receive the flange 76 carried by the upper end of the dispenser 77. The dispenser is provided with a handle 78 by means of which it can be placed in position within the valve and also with a scraper 79 which is designed to be rotated by means of the handle 80 for removing the contents of the dispenser.

The rear end of the valve is provided with a projection 81 which contacts with a push button 82 carried by the switch 83. The purpose of this switch is to complete the circuit between the electric conductors 84 and 85, and through the solenoid 86 when this circuit is closed, the solenoid works downward, pushing the valve stem 87 down, opening the valve 50, and upon breaking of the electric circuit the spring 88 automatically closes the valve. 89 is a stop formed integral with the valve housing 62 and is for the purpose of preventing the dipenser from being inserted too far as well as to act as a support therefor while being charged.

It will also be noted from Fig. 2 that the gear 69 passes through an opening 90 formed in the bottom of the valve housing. It will be further noted from Fig. 2 that by the construction of my device, the valve when in open position is entirely enclosed so that there is no possibility of any foreign substances, such as dust or the like, or of any insects from alighting on the valve and causing unsanitary conditions.

It is my intention to dispense the ice cream and like articles from bulk, that is the ice cream will be delivered in a can and removed therefrom and inserted in the magazine 28, it being my intention to have the ice cream wrapped in waxed paper or parchment at the factory prior to being placed in the delivery can so that it can be readily removed and placed in the magazine without the necessity of handling the ice cream. However this wrapping of the ice cream is not essential to my invention, as there may be other means of inserting the ice cream in the magazine without handling it, and in that instance, the wrapping of the cream would be unnecessary.

I may also, if desired, use hydraulic pressure to force out the cream, or screw pressure. In using hydraulic pressure a valve operating in the same manner as the valve 50 would be employed, and in utilizing screw pressure the screw would be driven by a motor, the operation of which would be controlled by the solenoid so that regardless of what style pressure I use, the application of the pressure would be controlled in identically the same manner as illustrated.

The operation of my device is as follows: The ring 25 is first removed thereby permitting the removal of the head 27. This removal of the head is facilitated by reason of the flexible tube 38. The piston 33 is then withdrawn and a charge of ice cream inserted in the magazine. During this charging operation, or immediately before, the tank 46 is filled with a non-freezing solution, such as brine, or the like, and the refrigerant introduced through the coil 47, chilling the solution. After this solution has become chilled, the pump 43 is placed in operation drawing out chilled solution from the tank and forcing it through the pipe 41 and into the casing 19. From the casing 19 it passes up through the pipe 15 and back to the tank 46, through the pipe 48, thus it will be seen that the magazine, as well as the delivery pipe 30, is surrounded with a chilling fluid which will keep the ice cream in perfect condition.

After a charge has been placed in the magazine, the piston 33 is inserted and pushed up against the charge. The head 27 is then secured in position, the air pump 53 is placed in operation, which operation continues until the tank 51 contains the desired air pressure, after which the automatic switch 55 operates and stops the motor 54, thus automatically halting the supply of air to the air tank. The valve 67 is then moved backward into the position indicated in Figs. 1 and 2. The moving backward of this valve causes the pin 81 to contact with the button 82, closing the circuit through the wires 84 and 85 to the solenoid. The solenoid is operated, pushing down on the valve stem 87 and compressing the coil spring 88, and simultaneously opening the valve 50 and permitting air pressure from the tank to enter behind the piston 33, pushing it forward. The forward movement of this piston exerts a lateral pressure on the ice cream forcing it into the pipe 30. This forward movement is continued until ice cream commences to issue from the forward end of the pipe 30. As soon as this occurs, the handle 72 is operated, sliding the valve 67 across the opening and preventing any ice cream from issuing. The forward movement of this valve also automatically breaks the electric circuit through the solenoid by permitting the switch to open, and the coil spring 88 then forces up the valve stem, closing the valve thereby halting any further delivery of pressure to the piston.

When it is desired to serve ice cream, the dispensing cup 87 is placed in position in the bore 75, the handle 78 passing through the slots 74 formed in the forward portion of the valve. The handle is then operated in the reverse direction, rotating the gear 69 and forcing the valve rearward bringing the dispensing device beneath the discharge end of the pipe 30, and simultaneously with this again establishing the electric current through the solenoid permitting pressure to enter behind the piston.

When a sufficient time has elapsed to permit the dispensing device to be completely charged, the handle is operated in the opposite direction, again moving the valve forward and closing off the discharge end of the pipe 30 and at the same time again stopping the delivery of any further pressure to the piston. This is continued until the piston strikes the tapered end of the magazine after which no more ice cream will be discharged, and it will be necessary to again re-charge the magazine as previously described.

I may also, if desired, eliminate the piston 33 and apply the air pressure direct to the body of the ice cream without departing from the spirit of my invention.

From the foregoing description, it will be seen that the ice cream is entirely enclosed and kept from contamination at all times and there is no possibility for dust, ice, salt or water entering the container and spoiling the ice cream. Furthermore there will be no possibility of leaving the apparatus open to the atmosphere or to forget to close it, because in order to remove the dispenser the valve 67 must be closed before the dispenser can be removed from the valve. I do not desire to limit myself to the specific type of valve shown nor to the specific shape of dispenser, as the dispenser may be made so that when it is charged, the ice cream will be molded into various shapes.

An important feature of my device is that a predetermined quantity of ice cream is always forced into the dispenser, this being accurately gauged because when moving the dispenser forward, the under surface of the valve housing 62 adjacent the discharge end of the pipe 30 acts as a scraper and levels off the ice cream thereby insuring an equal quantity of ice cream to all customers and eliminating any possibility of the party dispensing the ice cream from playing favorites and giving some favorite customer a greater quantity of cream than they should have.

My object in making the dispenser removable is that when the same is not in use, it can be placed in a bowl of water and thus be protected against dust and flies. Furthermore by making the dispenser removable, the sale of ice cream can be facilitated by having several dispensers and while the ice cream is being removed from one onto a serving dish, another dispenser can be in charging position, and by the time the one dispenser has been emptied, the second dispenser will be full thereby greatly facilitating the service of ice cream especially in a rush.

It will be noted from Fig. 6 that the magazine 28 is provided with a reduced discharge opening 91 so that when the body of ice cream or similar substance is forced through, it will be elongated and reduced in diameter. This discharge opening may be either round as illustrated, or it may be of any other desired shape. Furthermore instead of surrounding the magazine 28 and the pipe 30 with a pre-chilled non-freezing solution, a refrigerant may be circulated therethrough or both the pipe 30 and the magazine 28 can be surrounded with a coiled pipe carrying a refrigerating agent without departing from the spirit of my invention.

Having fully described my invention, what I claim is:—

1. In an apparatus for dispensing ice cream comprising a magazine adapted to hold a body of cream, a restricted discharge opening formed in one end of said magazine, a valve for closing said discharge opening, a dispensing device adapted to be moved into alignment with said opening when said valve is opened, means for applying pressure to the interior of said magazine at the end opposite said opening simultaneously with the opening of the valve, and means for automatically stopping the application of additional pressure when said valve is closed.

2. In an apparatus for dispensing ice cream comprising a magazine adapted to hold a body of cream, a restricted discharge opening formed in one end of said magazine, a pipe carried by said magazine and surrounding said discharge opening, a valve for closing said pipe, a dispensing device adapted to be moved into communication with said pipe when said valve is opened, means for supplying pressure to the interior of said magazine at the end opposite said opening, means for automatically stopping the application of additional pressure when said valve is closed, a casing surrounding the magazine on its sides and one end spaced apart therefrom, a pipe carried by said casing and surrounding said first mentioned pipe in spaced apart relation thereto, and means for circulating a chilling fluid in said casing and second mentioned pipe for chilling the contents of said magazine and said first mentioned pipe.

3. An apparatus for dispensing ice cream and the like, a magazine, a restricted discharge opening at one end of said magazine, a delivery pipe attached to said magazine and surrounding said opening, a removable head located at the opposite end of said magazine, a valve for closing said delivery pipe, a dispenser carried by said valve, and means automatically operated by said valve whereby pressure can be delivered into said magazine when the valve is in opened position, and delivery of additional pressure automatically stopped when said valve is in closed position.

4. An apparatus for dispensing ice cream and the like, a magazine, a restricted discharge opening at one end of said magazine, a delivery pipe carried by said magazine and surrounding said opening, means for circulating a chilling fluid around said magazine and delivery pipe, a removable head located at the opposite end of said magazine, a valve for closing said discharge opening, a dispenser carried by said valve, means automatically operated by said valve whereby pressure can be delivered into said magazine when the valve is in opened position, and the delivery of additional pressure automatically stopped when said valve is in closed position, and means for circulating a cooling agent around the major portion of said magazine and discharge outlet.

In testimony whereof I have affixed my signature.

FREDERICK E. KEY.